(12) United States Patent
Dwiel et al.

(10) Patent No.: US 12,657,031 B2
(45) Date of Patent: *Jun. 16, 2026

(54) COPROCESSOR PREFETCHER

(71) Applicant: Apple Inc., Cupertino, CA (US)

(72) Inventors: Brandon H. Dwiel, Boston, MA (US); Andrew J. Beaumont-Smith, Cambridge, MA (US); Eric J. Furbish, Austin, TX (US); John D. Pape, Cedar Park, TX (US); Stephen G. Meier, Los Altos, CA (US); Tyler J. Huberty, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 18/783,937

(22) Filed: Jul. 25, 2024

(65) Prior Publication Data

US 2025/0094174 A1    Mar. 20, 2025

Related U.S. Application Data

(63) Continuation of application No. 18/361,244, filed on Jul. 28, 2023, now Pat. No. 12,050,918, which is a continuation of application No. 17/643,765, filed on Dec. 10, 2021, now Pat. No. 11,755,333.

(60) Provisional application No. 63/247,703, filed on Sep. 23, 2021.

(51) Int. Cl.
G06F 9/38 (2018.01)

(52) U.S. Cl.
CPC ............ G06F 9/3881 (2013.01); G06F 9/382 (2013.01); G06F 9/383 (2013.01); G06F 9/3877 (2013.01)

(58) Field of Classification Search
None
See application file for complete search history.

(56) References Cited

U.S. PATENT DOCUMENTS

| | | | |
|---|---|---|---|
| 5,961,631 A | 10/1999 | Devereux et al. | |
| 6,681,318 B2 | 1/2004 | Chaudhry et al. | |
| 6,832,305 B2 | 12/2004 | Park et al. | |
| 9,304,774 B2 | 4/2016 | Dockser et al. | |
| 11,755,333 B2 | 9/2023 | Dwiel | |
| 12,050,918 B2 * | 7/2024 | Dwiel | G06F 9/3832 |

(Continued)

*Primary Examiner* — Keith E Vicary
(74) *Attorney, Agent, or Firm* — Kowert, Hood, Munyon, Rankin & Goetzel, P.C.; Michael B. Davis; Dean M. Munyon

(57) ABSTRACT

A prefetcher for a coprocessor is disclosed. An apparatus includes a processor and a coprocessor that are configured to execute processor and coprocessor instructions, respectively. The processor and coprocessor instructions appear together in code sequences fetched by the processor, with the coprocessor instructions being provided to the coprocessor by the processor. The apparatus further includes a coprocessor prefetcher configured to monitor a code sequence fetched by the processor and, in response to identifying a presence of coprocessor instructions in the code sequence, capture the memory addresses, generated by the processor, of operand data for coprocessor instructions. The coprocessor is further configured to issue, for a cache memory accessible to the coprocessor, prefetches for data associated with the memory addresses prior to execution of the coprocessor instructions by the coprocessor.

20 Claims, 9 Drawing Sheets

(56)          References Cited

U.S. PATENT DOCUMENTS

| | | |
|---|---|---|
| 2004/0186960 A1 | 9/2004 | Poggio |
| 2018/0074824 A1 | 3/2018 | Sazegari et al. |

* cited by examiner

600

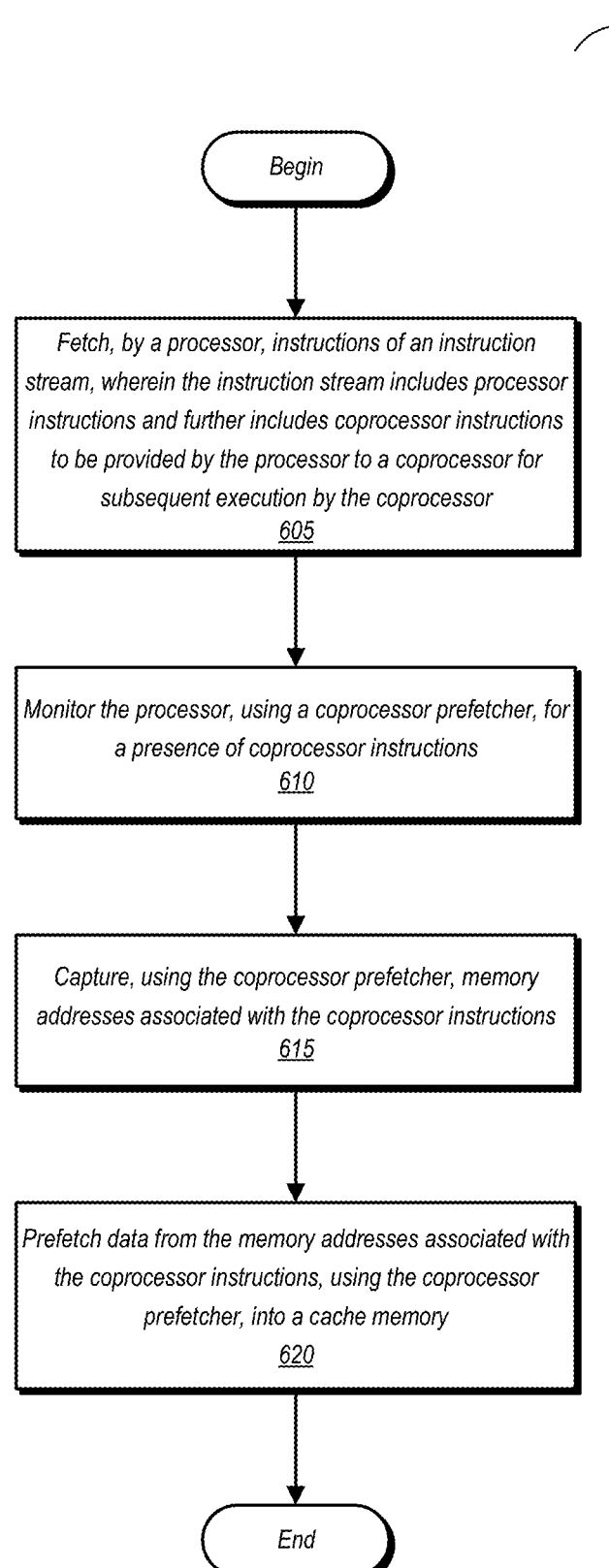

Begin

Fetch, by a processor, instructions of an instruction stream, wherein the instruction stream includes processor instructions and further includes coprocessor instructions to be provided by the processor to a coprocessor for subsequent execution by the coprocessor
605

Monitor the processor, using a coprocessor prefetcher, for a presence of coprocessor instructions
610

Capture, using the coprocessor prefetcher, memory addresses associated with the coprocessor instructions
615

Prefetch data from the memory addresses associated with the coprocessor instructions, using the coprocessor prefetcher, into a cache memory
620

End

*FIG. 6*

COPROCESSOR PREFETCHER

PRIORITY CLAIM

The present application is a continuation of U.S. application Ser. No. 18/361,244, entitled "Coprocessor Prefetcher," filed Jul. 28, 2023, which is a continuation of U.S. application Ser. No. 17/643,765, entitled "Coprocessor Prefetcher," filed Dec. 10, 2021 (now U.S. Pat. No. 11,755, 333), which claims priority to U.S. Provisional Application No. 63/247,703, entitled "Coprocessor Prefetcher," filed Sep. 23, 2021; the disclosures of each of the above-referenced applications are incorporated by reference herein in their entireties.

BACKGROUND

Technical Field

This disclosure is directed to processors, and more particularly, to prefetchers to fetch data for processors.

Description of the Related Art

Processors are a critical component of many digital systems, often determining how much performance and/or power efficiency can be achieved in the system. In some cases, a subset of the instruction set implemented by the processors can be implemented in a coprocessor that can be higher performance and/or more efficient at executing the subset of the instructions than the processor. Alternatively, instructions can be added to the instruction set that are specifically designed to be executed by the coprocessor, using specialized hardware that a general purpose processor would not implement.

The coprocessor generally executes instructions independently once they are dispatched to the coprocessor. Furthermore, when instructions are dispatched thereto, the coprocessor may perform memory accesses to load data (e.g., operands for the instructions) into a cache memory.

SUMMARY

A prefetcher for a coprocessor is disclosed. In one embodiment, an apparatus includes a processor and a coprocessor that are configured to execute processor and coprocessor instructions, respectively. The processor and coprocessor instructions appear together in code sequences fetched by the processor, with the coprocessor instructions being provided to the coprocessor by the processor. The apparatus further includes a coprocessor prefetcher configured to monitor a code sequence fetched by the processor and, in response to identifying a presence of coprocessor instructions in the code sequence, capture the memory addresses, generated by the processor, of operand data for coprocessor instructions. The coprocessor is further configured to issue, for a cache memory accessible to the coprocessor, prefetches for data associated with the memory addresses prior to execution of the coprocessor instructions by the coprocessor.

BRIEF DESCRIPTION OF THE DRAWINGS

The following detailed description makes reference to the accompanying drawings, which are now briefly described.

FIG. 6 is a flow diagram illustrating one embodiment of a method for operating a coprocessor having a dedicated prefetcher.

DETAILED DESCRIPTION OF EMBODIMENTS

Figure 1:
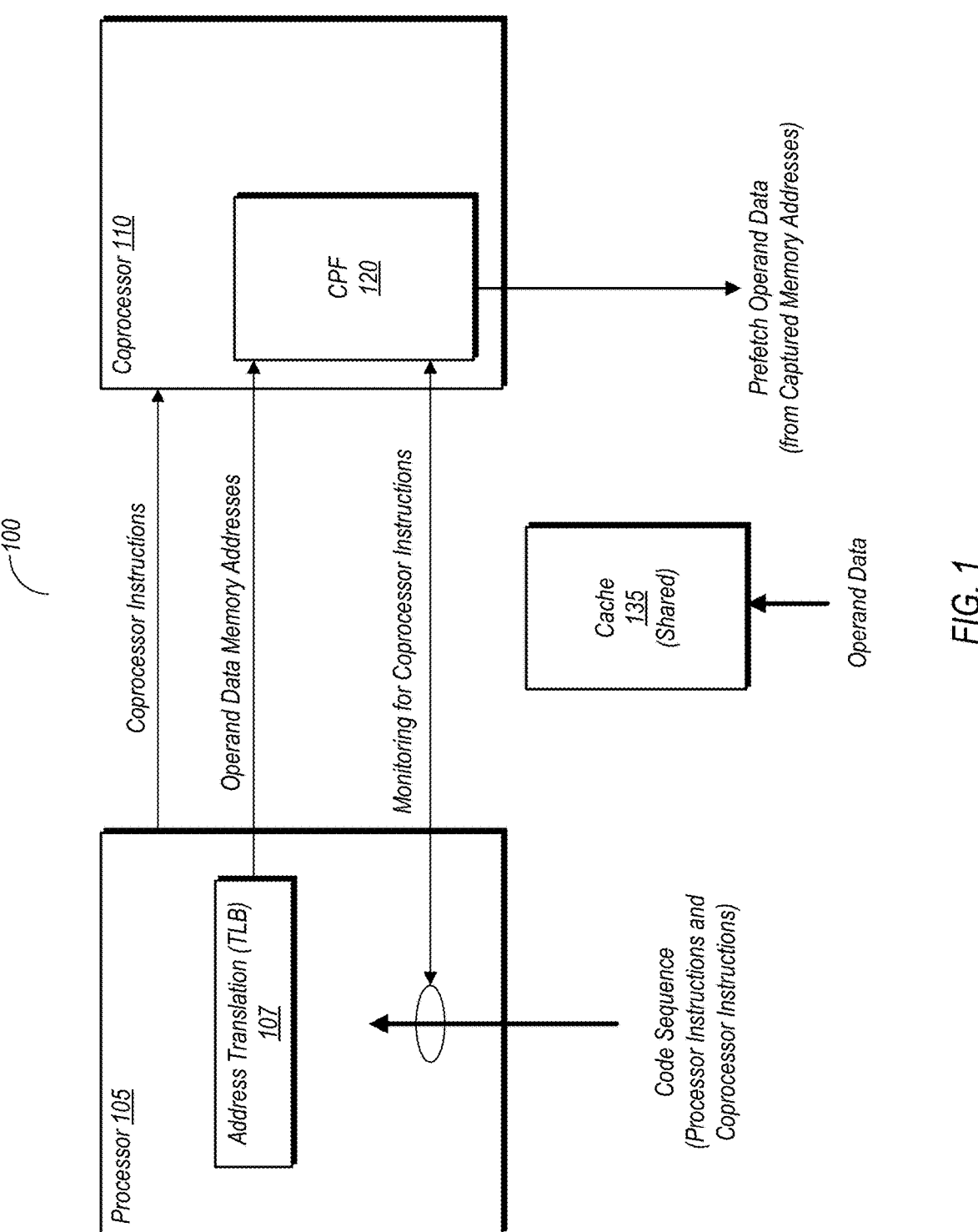
FIG. 1 is a block diagram of one embodiment of an apparatus including a processor and a coprocessor having a dedicated coprocessor prefetcher.

The present disclosure is directed to a prefetcher for a coprocessor. Many processors utilize coprocessors for certain operations. For example, a superscalar processor may utilize a coprocessor that is optimized for executing matrix and/or vector instructions. The instructions executed by the coprocessor may be in an instruction stream that is initially received by the processor, with the coprocessor instructions being dispatched at some point thereafter.

In some instances, a coprocessor may access a cache (shared with the processors) for operand data to be used in the execution of instructions. However, a coprocessor may oftentimes experience misses in the cache when attempting to access operands, leading to delay in the execution of coprocessor instructions, and more generally, reduced performance.

The present disclosure makes use of the insight that there are certain characteristics of coprocessor instructions that may be exploited by a prefetcher. For example, instructions for a coprocessor may be routed through a store queue of a corresponding processor. Furthermore, a processor may generate physical addresses of the data used as operands for the coprocessor instructions prior to their dispatch to the coprocessor.

In light of the above, the present disclosure contemplates a prefetcher dedicated to prefetching data to be used as operands for coprocessor instructions. In one embodiment, a prefetcher monitors a store queue of the main processor for the presence of coprocessor instructions and address translations for data to be used as corresponding operands. When the presence of coprocessor instructions is detected in the store queue, the coprocessor prefetcher may prefetch the data from the translated addresses into a shared cache to be made available when the coprocessor is ready to obtain the data for instruction execution. This may improve performance by reducing the latency of obtaining operand data for coprocessor instructions. The disclosure further contemplates that data loaded into the cache by the coprocessor prefetcher may further be loaded into registers of the coprocessor prior to the instructions being dispatched for execution from, e.g., an instruction buffer in the coprocessor. This may allow for additional performance gains.

Although the operand data for the coprocessor instructions is prefetched, it is noted that in various embodiments the prefetch is not considered to be predictive. This is due to the fact that the address of the operands are known at the time the prefetch is initiated by the coprocessor prefetcher. This is in contrast to certain other types of prefetchers by which data is prefetched from an address that is a prediction of where operand data resides in memory, and thus there is some uncertainty at the time of the prefetch as to whether it will actually be used. This uncertainty is eliminated for the coprocessor prefetcher since it utilizes a known physical address of operand data for pending instructions.

It is noted that there may be other prefetchers present in, e.g., the processors that are used to prefetch operand data, and it is possible that in some instances, these prefetchers may prefetch operand data for coprocessor instructions using techniques that differ from the coprocessor prefetcher. Accordingly, to avoid duplication of effort, various ones of the prefetchers in some embodiments may exchange indications with other ones of the prefetchers in response to having prefetched operand data.

Figure 4:
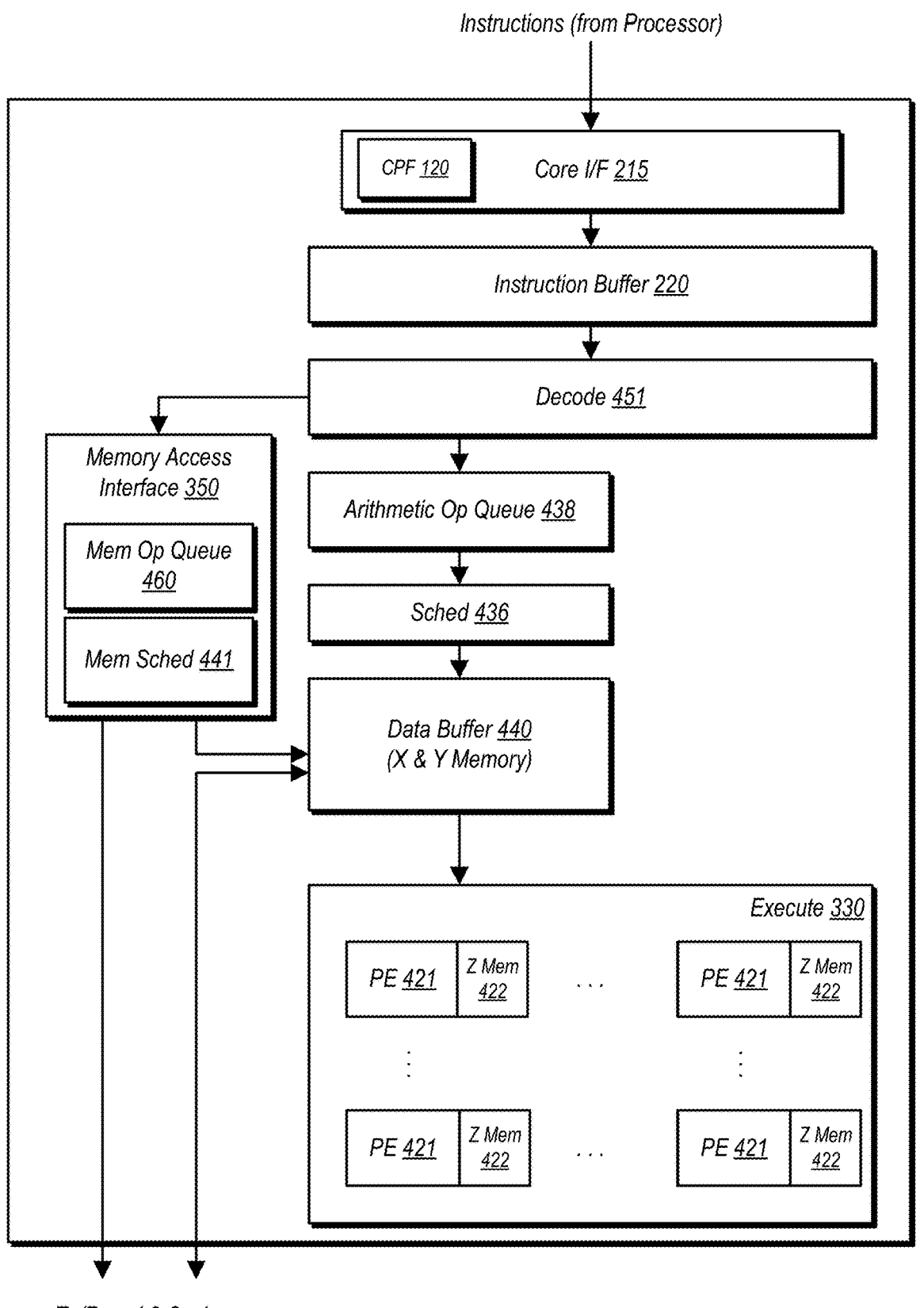
FIG. 4 is a block diagram illustrating details of one embodiment of a coprocessor.
Figure 5A:
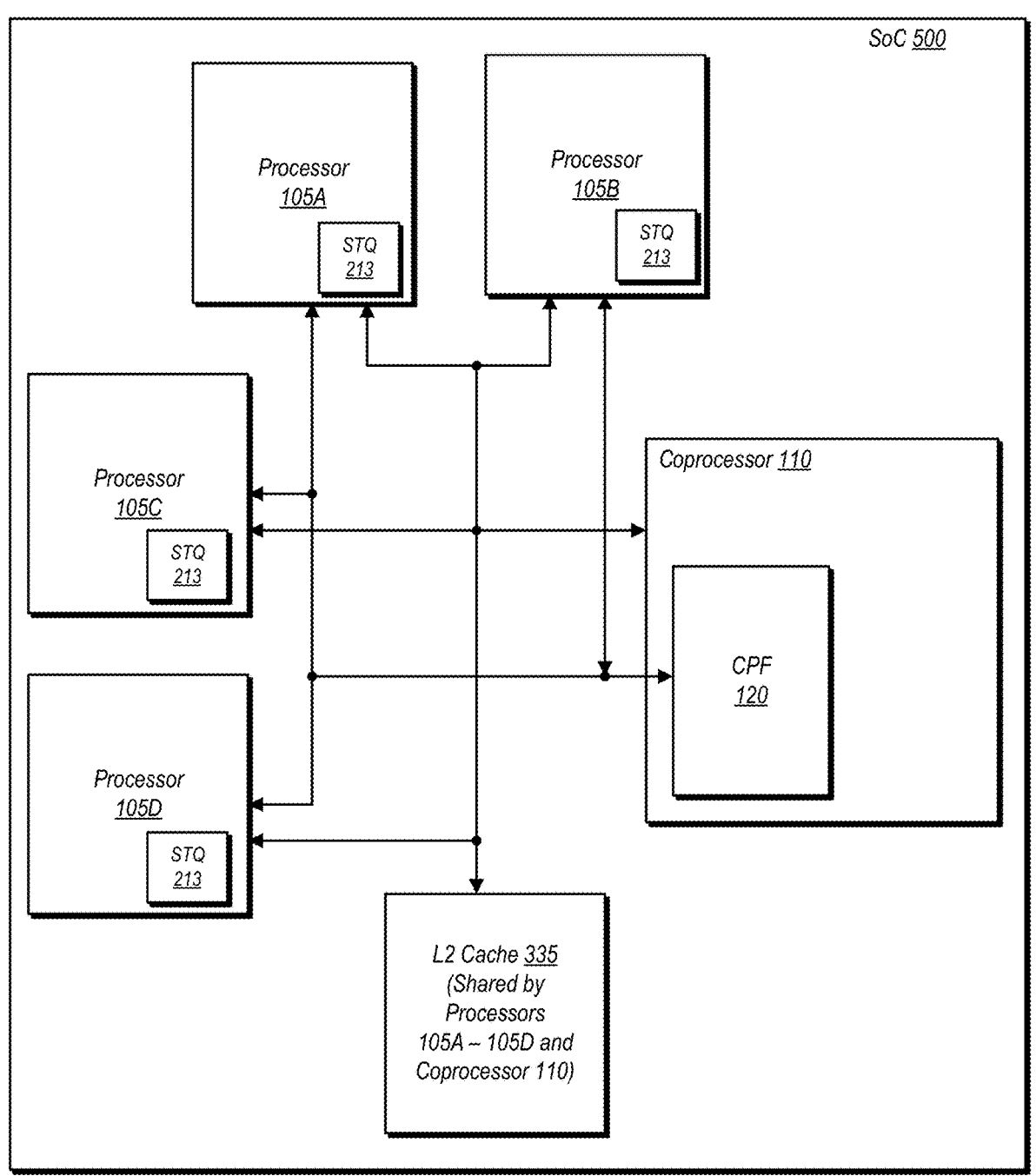
FIG. 5A is a block diagram illustrating one embodiment of an apparatus including a coprocessor and a number of processors.
Figure 5B:
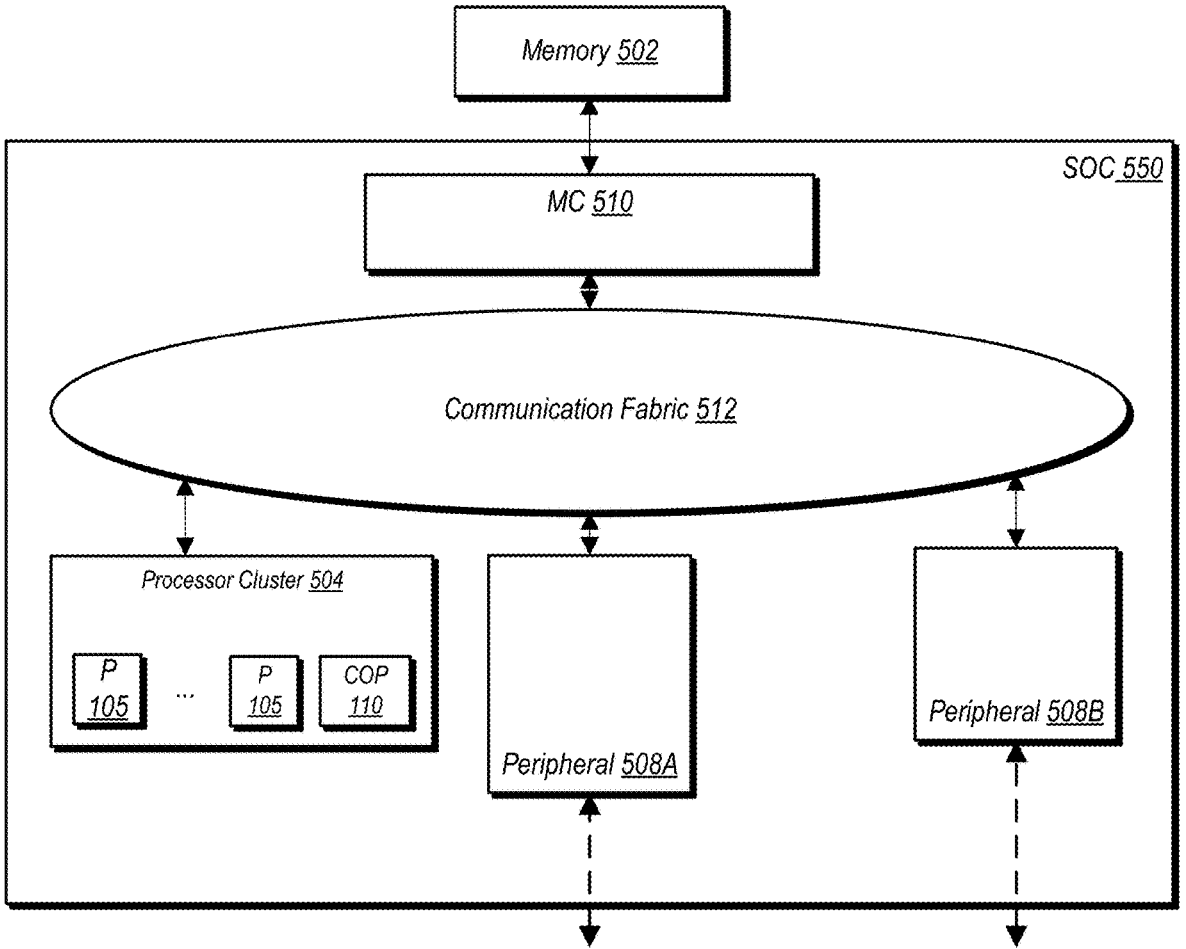
FIG. 5B is a block diagram illustrating one embodiment of a system-on-a-chip including a coprocessor and a number of processors.
Figure 7:
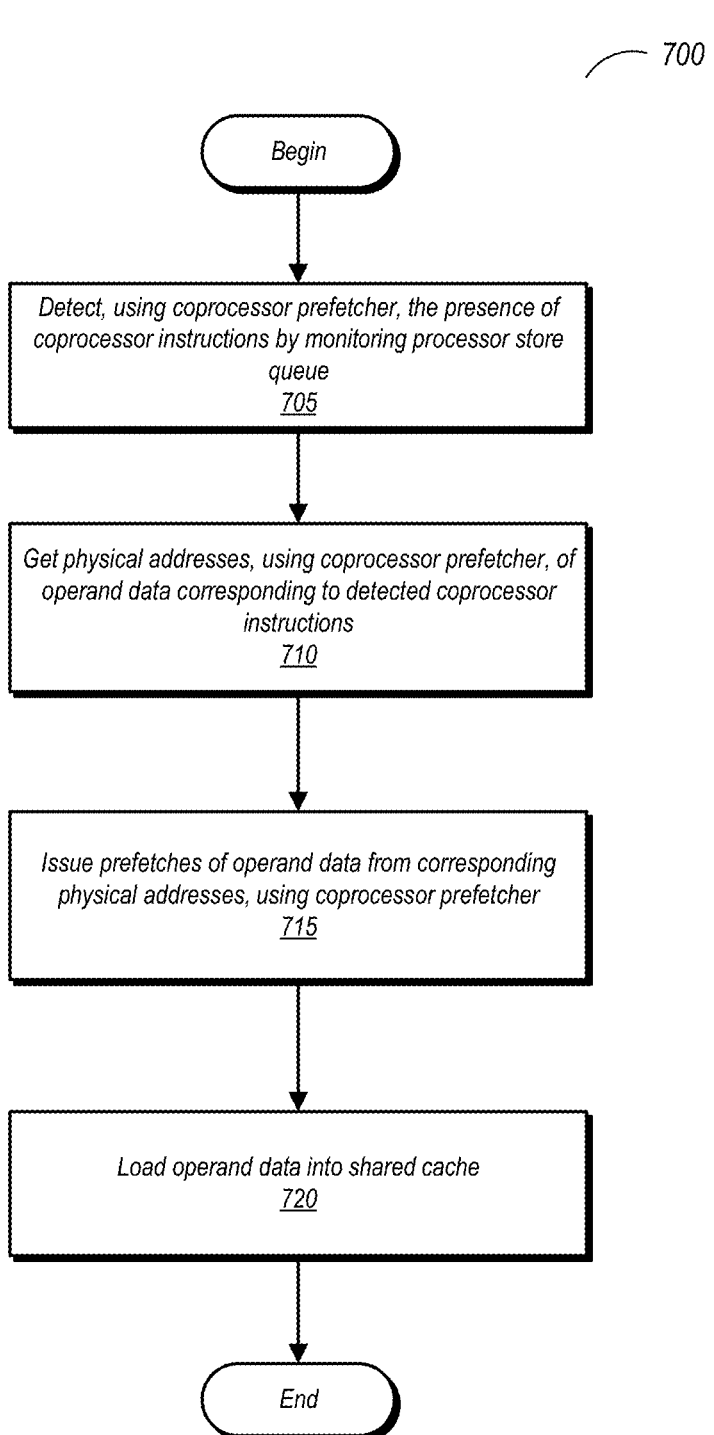
FIG. 7 is a flow diagram illustrating another embodiment of a method for operating a coprocessor having a dedicated prefetcher.

Embodiments of an apparatus including a coprocessor having a coprocessor prefetcher are now discussed in further detail below. The discussion begins with a description of FIGS. 1-3, which are directed to one embodiment of an apparatus including a processor and a coprocessor, with the coprocessor having a dedicated prefetcher. FIG. 4 is then discussed to provide additional details for one embodiment of a coprocessor. FIGS. 5A and 5B are then described to provide additional details of various embodiments of a system in which a coprocessor according to the disclosure may be implemented. The discussion of FIGS. 6 and 7 provide details of method embodiments corresponding to operating a dedicated coprocessor prefetcher. The discussion closes with a description of the example system shown in FIG. 8.

Coprocessor with Dedicated Coprocessor Prefetcher:

FIG. 1 is a block diagram of one embodiment of an apparatus 100 including a processor 105 and a coprocessor 110. In the embodiment shown, processor 105 may be a general purpose processor arranged to execute a majority of instructions (processor instructions) of an instruction set architecture. Coprocessor 110, on the other hand, may play a subordinate role to processor 105. In playing a subordinate role to processor 105, coprocessor 110 may augment the former by executing specific instructions (coprocessor instructions) of the instruction set for which it is optimized. For example, embodiments of coprocessor 110 that are optimized for vector and/or matrix instructions are possible and contemplated, while other instructions may be executed by processor 105.

In the processor instructions and the coprocessor instructions embodiment shown, processor instructions and coprocessor instructions appear together in code sequences fetched by the processor. The coprocessor instructions, subsequent to their receipt by processor 105, may be provided to coprocessor 110 for execution.

Coprocessor 110 in the embodiment shown includes a coprocessor prefetcher 120. Coprocessor prefetcher 120 in the embodiment shown is configured to perform prefetches of operand data to be used in the execution of coprocessor instructions. In the embodiment shown, coprocessor prefetcher 120 monitors a code sequence that is fetched by processor 105 for the presence of coprocessor instructions. Upon receiving instructions of a code sequence, processor 105 may carry out memory address translations using address translation circuitry 107 (which is a translation lookaside buffer, or TLB, in one embodiment). The addresses may be received as logical memory addresses and thus a translation may produce their corresponding physical memory addresses. The physical addresses may correspond to memory locations of operand data for instructions to be executed. The translation of logical memory addresses to physical memory addresses includes performing address translations for operand data to be used in the execution of coprocessor instructions. Accordingly, in response to detecting coprocessor instructions in the instruction stream, coprocessor prefetcher 120 may capture the memory addresses from processor 105. Using these physical addresses, coprocessor prefetcher 120 may launch a prefetch of the operand data for the detected coprocessor instructions. The operand data may be obtained from the indicated addresses in a system memory and loaded into cache 135, which is shared by both processor 105 and coprocessor 110.

In contrast to many prefetchers, the prefetches carried out by coprocessor prefetcher 120 are not predictive in the embodiment discussed above. Instead, the address of the operand data is known based on the physical address provided by the processor 105. This is in contrast to prefetchers (e.g., stride prefetchers) which access data from addresses that are predicted to be storing operand data for instructions to be executed at a later time. Thus, since the addresses in those types of prefetchers are predicted, there is a measure of uncertainty that is not present with the embodiment of coprocessor prefetcher 120 discussed herein, which uses known physical addresses provided by processor 105.

Since the prefetches carried out by coprocessor prefetcher 120 are not predictive, it thus follows that training of this prefetcher is not required, in contrast to prefetchers that perform predictive prefetches. For example, where a stride prefetcher may need training to determine a number of addresses to increment to increase the chances of the next prefetch being accurate, coprocessor prefetcher 120 does not need training since it is initiating prefetches based on known physical memory addresses of operand data that is to be used for coprocessor instructions in a code sequence received by processor 105.

Moreover, the ability to prefetch operand data for coprocessor instructions before these instructions are received or dispatched into an execution pipeline of coprocessor 110 may prevent cache misses. This can enhance overall performance in execution of the instructions in a code sequence, as the latency of obtaining operand data for coprocessor instructions may be significantly reduced when it can be obtained from cache 135 as opposed to having to access it from system memory.

After prefetching operand data into cache 135, coprocessor 110 may subsequently load this data into registers therein (examples of which are provided below). The operation of loading operand data from cache 135 into coprocessor 110 may occur at various times. For example, coprocessor 110 may access cache 135 to obtain operand data in response to the coprocessor instructions being provided thereto by processor 105. Coprocessor 110 may include an execution pipeline, and thus the accessing of operand data from cache 135 may be carried out with the instructions at other points in the pipeline as well. In general, coprocessor prefetcher 120 may carry out prefetches to obtain operand data so that, at minimum, it is available in cache 135 no later than the time at which the coprocessor instructions are ready for execution.

It is noted that processor 105 and coprocessor 110 may include other components that are not shown here for the sake of simplicity. Various embodiments of a processor 105 and coprocessor 110 illustrating some of these other components will be discussed below.

Figure 2:
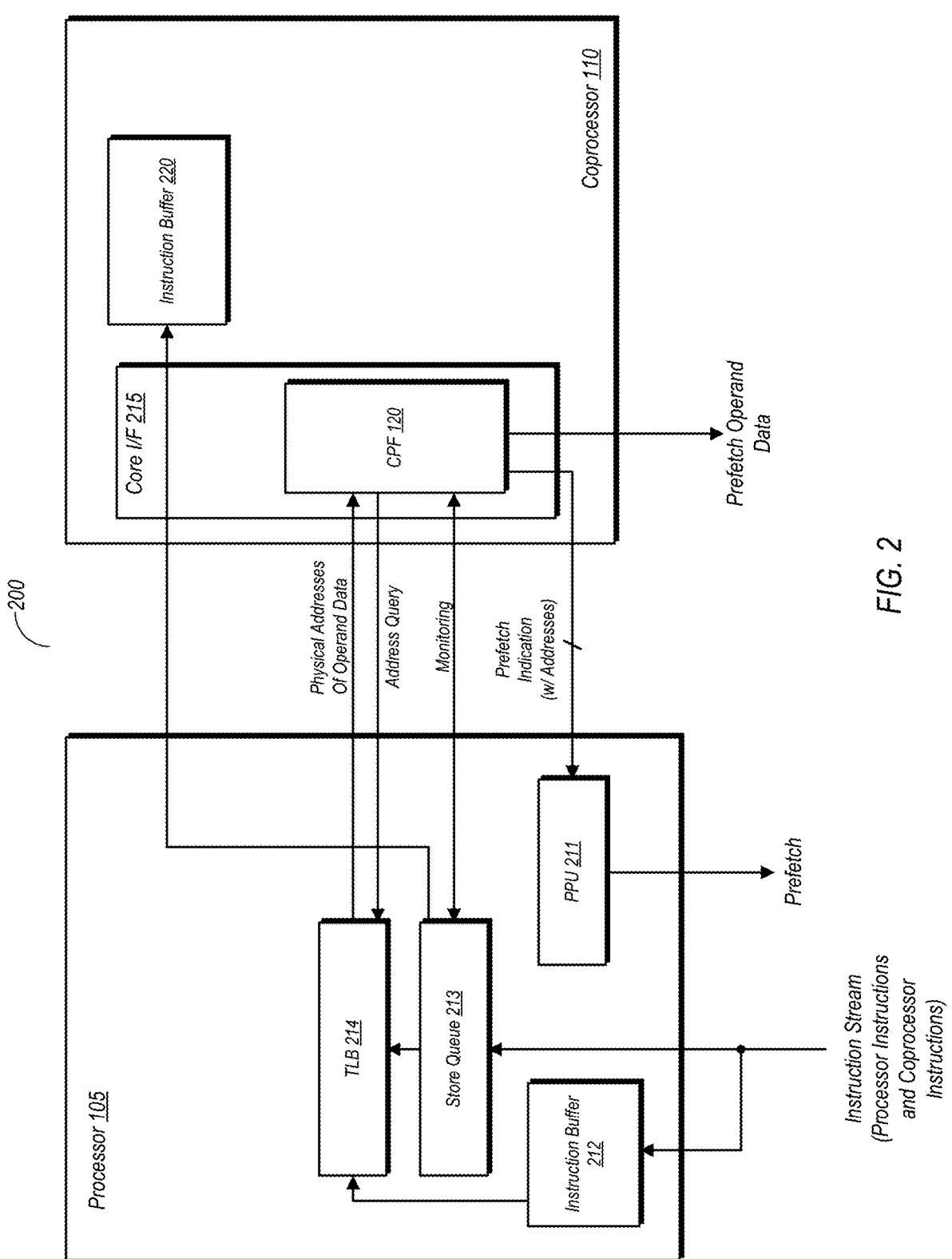
FIG. 2 is another block diagram illustrating details of one embodiment of an apparatus including a processor and a coprocessor having a dedicated coprocessor prefetcher.

FIG. 2 is another block diagram illustrating details of one embodiment of an apparatus including a processor and a coprocessor having a dedicated coprocessor prefetcher. In the embodiment shown, apparatus 200 includes processor 105 and coprocessor 110. Processor 105 in the embodiment shown includes an instruction buffer 212, a processor prefetch unit (PPU) 211, a store queue 213, and a translation lookaside buffer (TLB) 214. Coprocessor 110 in the embodiment shown includes a core interface 215 having a coprocessor prefetcher 120 implemented therein, and also includes an instruction buffer 220. Core interface 215 may more generally perform various functions to facilitate communications between processor 105 and coprocessor 110.

In the embodiment shown, processor 105 may receive a code sequence/instruction stream that includes processor instructions and coprocessor instructions. Some processor instructions may be stored in an instruction buffer 212, while the coprocessor instructions may be stored in store queue 213, which may also provide buffering for store instructions to be carried out by processor 105. Although not explicitly shown here, store queue 213 may be part of a load-store unit for carrying out load and store instructions. TLB 214 may store logical-to-physical address translations, including translations for operand data for both processor instructions and coprocessor instructions.

Coprocessor prefetcher 120 in the embodiment shown may monitor the instruction stream/code sequence for the presence of coprocessor instructions by monitoring store queue 213. By monitoring the content in store queue 213, coprocessor prefetcher 120 may detect the presence of coprocessor instructions. In response to detecting the presence of coprocessor instructions in store queue 213, coprocessor prefetcher 120 may send a query to TLB 214 to obtain the memory addresses of the operand data corresponding to the detected coprocessor instructions. For example, coprocessor prefetcher 120 may send identification information for the detected coprocessor instructions to TLB 214 as part of the query. In response, TLB 214 may provide the physical memory addresses of the operand data for the detected coprocessor instructions.

In response to receiving the physical memory addresses, coprocessor prefetcher 120 may initiate a prefetch of the corresponding operand data from a system memory (not shown). The operand stored at the corresponding memory addresses may then be loaded into a cache, such as cache 135 of FIG. 1. Thereafter, coprocessor 110 may obtain the operand data from the cache for use in execution of the corresponding coprocessor instructions.

As noted above, the coprocessor instructions, originally received by processor 105, are subsequently provided to coprocessor 110. In the embodiment shown, the coprocessor instructions are provided from store queue 213, via core interface 215, to an instruction buffer 220 in coprocessor 110. At this point, the coprocessor instructions may be dispatched into a coprocessor pipeline for subsequent execution.

Processor 105 in the embodiment shown includes PPU 211. PPU 211 may include one or more prefetchers that operate according to various prefetch schemes in order to prefetch data from a system memory into a cache, such as cache 135 of FIG. 1. PPU 211 may implement, for example, a stride prefetcher, a stream buffer, a correlation prefetcher, or any other suitable type. Unlike coprocessor prefetcher 120, the prefetches carried out by PPU 211 may be predictive in that they may predict the memory addresses of operand data corresponding to processor instructions that have not yet been received. Since the instructions have not yet been received, the memory addresses at which the corresponding operands may be stored are unknown, and thus a prediction is made in an effort to obtain this data. However, since the prefetches are predictive, it is thus possible that the predictions may be incorrect at times. Meanwhile, as noted above, prefetches carried out by coprocessor prefetcher 120 are not predicted, since the addresses of the corresponding operand data are known at the time the prefetch is initiated. In the embodiment shown, coprocessor prefetcher 120 may provide an indication to PPU 211 when a prefetch is initiated. The indication may include the address or addresses from which the operand data is being obtained. By sending the indication along with the address information, PPU 211 may avoid duplication of effort by avoiding prefetches of operand data for coprocessor instructions even if their respective addresses may have otherwise been predicted thereby.

Figure 3:
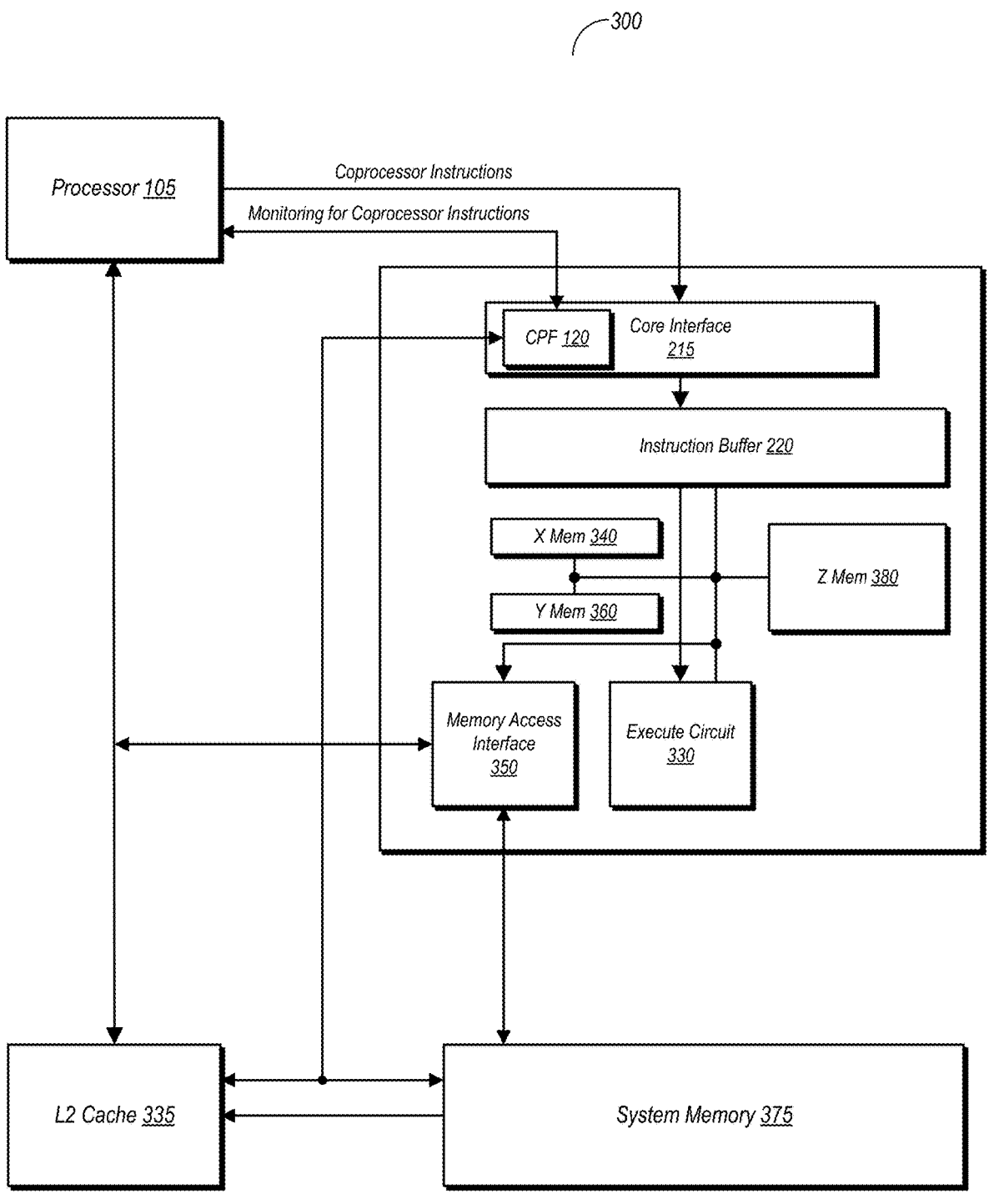
FIG. 3 is another block diagram illustrating details of one embodiment of an apparatus including a processor and a coprocessor having a dedicated coprocessor prefetcher.

FIG. 3 is a block diagram of one embodiment of a system including a processor 105, a coprocessor 110, and a level two (L2) cache 335. In the illustrated embodiment, the processor 105 is coupled to the L2 cache 335 and the coprocessor 110. Coprocessor 110 is also coupled to the L2 cache 335 as well in the embodiment shown. The coprocessor 110 may include an instruction buffer 220, an X memory 340, a Y memory 360, a Z memory 380, an execution circuit 330, and a memory access interface 350 coupled to each other. In some embodiments, circuits may be coupled if they are electrically coupled (e.g., directly connected or indirectly connected through one or more other circuits) and/or communicatively coupled.

The coprocessor 110 may be configured to perform one or more computation operations and one or more coprocessor load/store operations. The coprocessor 110 may employ an instruction set, which may be a subset of the instruction set implemented by the processor 105. The processor 105 may recognize instructions implemented by the coprocessor 110 and may issue the instructions to the coprocessor 110 for execution. Any mechanism for transporting the coprocessor instructions from the processor 105 to the coprocessor 110 may be used. For example, FIG. 3 illustrates a communication path between the processor 105 and the coprocessor 110. The path may be a dedicated communication path, for example if the coprocessor 110 is physically located near the processor 105. The communication path may be shared with other communications, some of which may be carried out by other agents. For example, a packet-based communication system could be used to transmit memory requests to the system memory and instructions to the coprocessor 110. In one particular embodiment, coprocessor instructions may be communicated through the L2 cache 335 to the coprocessor 110. In an embodiment, instructions may be bundled and transmitted to the coprocessor 110. For example, cache operations, cache evictions, etc. may be transmitted by the processor 105 to the L2 cache 335, and thus there may be an interface to transmit an operation and a cache line of data. The same interface may be used, in an embodiment, to transmit a bundle of instructions to the coprocessor 110 through the L2 cache 335.

In one embodiment, the computation operations specified by the instructions implemented in the coprocessor 110 may be performed on vectors of input operands. For example, an embodiment receives vectors of operands from the X memory 340 and the Y memory 360. Operand data that is prefetched by coprocessor prefetcher 120 may be loaded into X memory 340 and/or Y memory 360 in the time between completion of the prefetch and the execution of the corresponding instructions. In one embodiment, the prefetched operand data may be loaded into X memory 340 and/or Y memory 360 in response to coprocessor 110 receiving the corresponding coprocessor instructions from processor 105.

The execution circuit 330 may include an array or grid of processing elements (circuits) to perform the operations (an embodiment of execution circuit 330 is further discussed below in reference to FIG. 4). Each circuit may receive one or more of the vector elements from the X memory 340 and one or more of the vector elements from the Y memory 360, and may evaluate the operation on the vector elements. In an embodiment, the result of the operation may be accumulated with the current value in a corresponding location in the Z memory 380, for write back to the corresponding location in the system memory 375. It is noted that in various embodiments, the Z memory 380 may be distributed among the various array or grid of processing elements, rather than being one physically contiguous memory. In an embodiment, the instructions executed by the coprocessor 110 may have a vector mode and a matrix mode. In the vector mode, each vector element of X is evaluated against a corresponding vector element of Y, producing a vector of results. In the matrix mode, an outer product of the input vector operands may be computed in one embodiment. In still another embodiment, various matrix operations may be supported using the matrix mode, and each vector element of X may be operated upon with each vector element of Y in the matrix mode. In still another embodiment, the X memory 340 and the Y memory 360 may store vectors of matrices (e.g., 2×2 matrices or any other size of matrices, stored in either column major or row major format). The array of processing elements may perform matrix operations on the matrices.

Based on the location of a given processing element in the array, there is a subset of the Z memory 380 that the processing element may update in response to coprocessor instructions. That is, each processing element produces a portion of the overall result of an instruction. The result produced over all of the processing elements (or a subset of the processing elements, if an instruction specifies fewer than all of the processing elements to perform an operation) is the result of the instruction, and the result is written to locations in the Z memory 380 that are dispersed over the address space of the Z memory 380 in a regular pattern that depends on the instruction and the operand size of the instruction. Up to all of the Z memory 380 may be updated in response to an instruction, but each processing element updates a restricted portion of the Z memory 380 (and that processing element may be the only processing element in the execution circuit 330 that may update the restricted portion). The instruction may specify a Z memory address for the result, and the address identifies the location(s) within the restricted portion that are updated.

In one embodiment, the Z memory 380 may thus be physically distributed over an area of the integrated circuit that is occupied by the coprocessor 110, along with the processing elements of the execution circuit 330. Thus, the depiction in FIG. 3 may be a logical diagram of the coprocessor 110, and the physical implementation may include distributing the Z memory 380 with the processing elements. Physically distributing the Z memory 380 may provide various benefits, in some embodiments. For example, the wiring to connect the Z memory 380 to the processing elements in the execution circuit 330 may be relatively short and compact as compared to if the Z memory 380 were implemented separately. This may lead to savings in area consumed, as well as power in reading and writing the Z memory 380.

In an embodiment, the coprocessor 110 may support various data types and data sizes (or precisions). For example, floating point and integer data types may be supported. The floating point data type may include 16-bit, 32-bit, and 64-bit precisions. The integer data types may include 8-bit and 16-bit precisions, and both signed and unsigned integers may be supported. Other embodiments may include a subset of the above precisions, additional precisions, or a subset of the above precisions and additional precisions (e.g., larger or smaller precisions). In an embodiment, 8-bit and 16-bit precisions may be supported on input operands, and 32-bit accumulations may be supported for the results of operating on those operands.

In an embodiment, some coprocessor instructions (e.g., coprocessor load/store instructions) may specify load operations and/or store operations to move data between the system memory and the X memory 340, Y memory 360, and Z memory 380. For example, load operations may transfer vectors between a system memory 375 and the X memory 340, Y memory 360, and/or Z memory 380. Similarly, the load and/or store operations may transfer vectors between L2 cache 335 and X memory 340, Y memory 360, and/or Z memory 380. During the prefetch operations discussed elsewhere in the disclosure, operand data may initially be prefetched into L2 cache 335, and subsequently loaded into X memory 340 and/or Y memory 360. The coprocessor store operations may write the vectors from the X and Y memories 340 and 360 to system memory. The Z memory 380 may be written to memory using an extract instruction to move the results to the X memory 340 and/or the Y memory 360, and then storing the results from the X memory 340 and/or the Y memory 360 to system memory. Alternatively, a store instruction to store the Z memory 380 to main memory may also be supported.

In an embodiment, the coprocessor 110 may be cache coherent with the processor 105. In an embodiment, the coprocessor 110 may have access to the L2 cache 335, and the L2 cache 335 may ensure cache coherency with the processor 105 caches. In yet another alternative, the coprocessor 110 may have access to the memory system, and a coherence point in the memory system may ensure the coherency of the accesses. In yet another alternative, the coprocessor 110 may have access to the caches within processor 105. In still another embodiment, the coprocessor 110 may have one or more caches (which may be virtually addressed or physically addressed, as desired). The coprocessor 110 may also have its own dedicated caches while also having the ability to access to the L2 cache 335 for misses in those caches. Any mechanism for accessing memory and ensuring coherency may be used in various embodiments.

The processor 105 may be responsible for fetching the instructions executed by the processor 105 and the coprocessor 110. In an embodiment, the coprocessor instructions may be issued by the processor 105 to the coprocessor 110 when they are no longer speculative. Generally, an instruction or operation may be non-speculative if it is known that the instruction is going to complete execution without exception/interrupt or flush due to incorrect speculation (e.g., branch misprediction). Thus, an instruction may be non-speculative once prior instructions (in program order) have been processed to the point that the prior instructions are known to not cause exceptions/speculative flushes in the processor 105 and the instruction itself is also known not to cause an exception/speculative flush. Some instructions may be known not to cause exceptions based on the instruction set architecture implemented by the processor 105 and may also not cause speculative flushes. Once the other prior instructions have been determined to be exception-free and flush-free, such instructions are also exception-free and flush-free.

The instruction buffer 220 may be provided to allow the coprocessor 110 to queue instructions while other instructions are being performed. In an embodiment, the instruction buffer 220 may be a first in, first out buffer (FIFO). That is, instructions may be processed in program order. Other embodiments may implement other types of buffers, multiple buffers for different types of instructions (e.g., load/store instructions versus compute instructions) and/or may permit out of order processing of instructions.

The X memory 340 and the Y memory 360 may each be configured to store at least one vector of input operands. Similarly, the Z memory 380 may be configured to store at least one computation result generated from a vector of operands from the X memory 340 and a vector of operands from the Y memory 360. The result may be a matrix of results at the result size (e.g., 16-bit elements, 32-bit elements, or 64-bit elements). Alternatively, the result may be a vector, depending on the instruction. In some embodiments, the X memory 340 and the Y memory 360 may be configured to store multiple vectors and/or the Z memory 380 may be configured to store multiple result matrices/vectors. Each vector/matrix may be stored in a different bank in the memories, and operands for a given instruction may be identified by bank number. More generally, each entry in the memories 340, 360, and 380 may be addressed by a register address (e.g., register number) and thus the entries in the memories may be viewed as registers, similar to an integer or floating point register in the processor 105 (although generally significantly larger than such a register in terms of storage capacity). Viewed in another way, each of the memories 340, 360, and 380 may be addressable as entries using addresses that are referenced to the particular memory (e.g., each memory 340, 360, and 380 may have its own address space). A given address of a given entry in the X memory 340, for example, may have the same numerical value as a second given address of a second given entry in the Y memory 360. Because they are coded in a given instruction as an X memory address or a Y memory address, the correct entry from the correct memory to be read/written may be selected by the coprocessor 110.

The execution circuit 330 may be configured to perform the computation operations, as previously mentioned. The memory access interface 350 may be configured to perform the coprocessor load/store operations. The coprocessor 110 may provide the coprocessor load/store operations from the instruction buffer 220 to the memory access interface 350, which may include a queue for the load/store operations and control logic to select the load/store operations for execution. The memory access interface 350 may further include a merge buffer to merge load operations and store operations, as mentioned previously and discussed in more detail below. The address of the coprocessor load/store operations may be provided with the operation from the processor 105. In one embodiment, the processor 105 may generate a virtual address from one or more address operands of the load/store operation, and may translate the virtual address to a physical address through a memory management unit (e.g., a translation lookaside buffer (TLB) and/or related hardware). In another embodiment, the coprocessor 110 may include a TLB and/or other MMU hardware, and the processor 105 may provide a virtual address which may be translated by the coprocessor 110. TLB management instructions executed by the processor 105 may also be transmitted to the coprocessor 110 in such embodiments, to manage the coprocessor 110 TLB coherently with the processor 105 TLB. However, for coprocessor store operations, the source data from one of the memories 340, 360, and 380 may not be available until prior compute operations have been completed. Coprocessor load operations may generally be ready for execution when provided to the memory access interface 350, but may have ordering constraints with younger coprocessor load/store operations. The memory access interface 350 may be configured to resolve the ordering constraints and transmit the memory operations to the L2 cache 335.

In an embodiment, the L2 cache 335 may be configured to check for a cache hit for the coprocessor load/store operations, and may also determine if the data (or a portion thereof) accessed by the coprocessor load/store operations is in a data cache in the processor 105. The L2 cache 335 may be inclusive of the CPU processor data cache, and thus the tag for the cache line in the L2 cache 335 may indicate if the cache line is in the data cache. Alternatively, the L2 cache 335 may include a set of tags for the data cache and may track which cache blocks are in the data cache in the set of tags. If the data is in the data cache, the L2 cache 335 may generate an operation to invalidate the data cache line (and fetch the data if it is modified). This operation may be referred to as a "back snoop" operation. Additionally, the L2 cache 335 may detect a cache miss for a coprocessor load/store operation, and may fetch the missing cache line from another lower level cache or the main memory to complete the request.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes (e.g., the data cache in the processor 105 may have a smaller cache line size than the L2 cache 335, in an embodiment). Each cache may have any desired capacity, cache line size, and configuration. The L2 cache 335 may be any level in the cache hierarchy (e.g., the last level cache (LLC) for the processor 105, or any intermediate cache level between the processor 105/coprocessor 110 and the main memory system). There may be more levels of cache between the CPU caches and the L2 cache 335, and/or there may be additional levels of cache between the L2 cache 335 and the main memory.

It is noted that the coprocessor 110 may be illustrated in simplified form, in an embodiment, and may include additional components not shown in FIG. 3. For example, the coprocessor 110 may include a pipeline to decode coprocessor operations, perform register renaming on the operands, use a physical memory size for the X memory 340 and Y memory 360 that is larger than the architected size, and execute computation operations out of order. Any implementation of the coprocessor 110 may be used in various embodiments.

It is noted that, in some embodiments, the coprocessor 110 may be shared by multiple instances of a processor, including processor 105. The coprocessor 110 may maintain separate contexts in the X memory 340, Y memory 360, and Z memory 380 for each processor, for example. Alternatively, contexts may be swapped in the coprocessor 110 when different processors issue coprocessor operations to the coprocessor 110.

Coprocessor Embodiment

FIG. 4 is a block diagram of one embodiment of the coprocessor 110 in greater detail. In the illustrated embodiment, the coprocessor 110 includes a core interface 215 having a coprocessor prefetcher 120 implemented therein, the instruction buffer 220, a decode unit 451, the memory access interface 350, an arithmetic operation (op) queue 438, a data buffer 440, the execution circuit 330, and a scheduler circuit 436. The execution circuit 330 includes an array of processing elements (PEs) 421, arranged as a grid of rows and columns. Each of the PEs 421 is coupled to a respective portion of a Z memory 422. The instruction buffer 220 is coupled to receive instructions to be executed by the coprocessor 110, and is coupled to the decode unit 451. The decode unit 451 is coupled to the arithmetic op queue 438, which is further coupled to the data buffer 440. The data buffer 440 is coupled to the execution circuit 330. The data buffer 440 is coupled to the memory access interface 350, and both the memory access interface 350 and the data buffer 440 are coupled to an L2 cache (not shown here). The memory access interface 350 includes a memory op queue 460 and a memory scheduler 441.

Generally, the coprocessor 110 may be configured to receive instructions in the instruction buffer 220. The decode unit 451 may decode the instructions into one or more operations (ops) for execution. The ops may include compute ops that are executed in the execution circuit 330, memory ops to read data from memory into the data buffer 440 and store data from the data buffer 440 to memory (via the L2 cache), and other ops that may update a system state. Scheduler 436 may schedule decoded instructions for execution by various ones of the PEs 421.

In one embodiment, the data buffer 440 may be the source of operands for compute ops executed by the execution circuit 330, and results may be stored in the distributed Z memory 421 within the execution circuit 330. That is, the data buffer 440 may include the storage for the X memory 340 and the Y memory 360 as shown in FIG. 3. The entries from the X memory 340 and the Y memory 360 may be renamed by the decode unit 451 to various entries in the data buffer 440 using register renaming techniques.

As mentioned previously, the coprocessor 110 may be designed to execute instructions which specify vectors of operands and a compute (arithmetic/logic unit (ALU)) operation to be performed on the operands. For example, various types of multiply/accumulate operations may be supported. The multiplications may be performed in parallel on the vectors of operands. Thus, the execution circuit 330 includes an array of processing elements (PEs) 421. The array of PEs 421 may include a horizontal direction (row) and a vertical direction (column), as illustrated in FIG. 4. Each PE 421 may receive an operand from one or more input vector elements for an op, and may perform the specified compute operation on the operands to produce a result. Some ops may specify a vector of results, and a subset of the PEs 421 may be used for such ops. Other ops may specify an array (or matrix) of results. For example, in an embodiment, the multiply-accumulate operations over the vectors of input operands may produce an outer product of the vectors. Other multiply-accumulate operations may be performed in matrix mode for such embodiments. Up to all of the PEs 421 may be used for matrix-mode ops. However, in some cases, even the array of results may not use all of the PEs 421. For example, in some cases, not all of the vector of input operands may be used.

In an embodiment, for matrix operations, the vector of operands from the Y memory 360 may be provided as a "column" to the execution circuit 330 and the vector of operands from the X memory 340 may be provided as a "row" to the execution circuit 330. Thus, a given vector element from the X memory 340 may be supplied to a column of PEs 421, and a given vector element from the Y memory 360 may be supplied to a row of PEs 421 for a matrix operation. Because different operand sizes are supported, the number of vector elements supplied to a given PE 421 depends on the operand size of the instruction. For example, if the execution circuit 330 has N PEs 421 in a row or column, each PE 421 may receive 1/Nth of the data from an entry. The number of operands in the data, and thus the number of operations performed by the PE 421 for a given instruction, may depend on the operand size of the instruction. In one embodiment, the largest operand size may be 1/Nth of the data from an entry (e.g. each PE 421 may operate on one operand at the largest operand size). The operand sizes vary by a power of 2, so each PE 421 may operate on two operands of the second largest operand size, four operands of the third largest operand size, etc.

An issued arithmetic op may read their source operands from the data buffer 440 and progress to the PEs 421 in the execution circuit 330 for execution. The PEs 421 may perform the specified operation, generating results and writing the results to the local Z memory locations 422 implemented at the PEs 421.

Similar to the scheduler circuit 436, the memory scheduler circuit 441 may wait for the source operands of the memory ops to be ready and issue the memory ops. The memory scheduler circuit 441 may ensure that memory ops to the same address are issued in program order (e.g. using dependency vectors or other mechanisms based on comparing the addresses accessed by the memory ops). The source operands may be store data for store memory ops. Load memory ops may not have specific source operands, since the memory addresses are provided by the processor 105 in this embodiment. However, load memory ops may still be scheduled based on address dependencies, if any. The store ops may read their source operands from the data buffer 440, which may transmit the data to the L2 cache 335 (as shown in FIG. 3) along with the memory op/address from the memory access interface 350. For load ops, the L2 cache 335 may provide data to the data buffer 440 (and the address at which the data is to be written, which may be transmitted to the L2 cache 335 by the memory access interface 350 when transmitting the load ops). The writing of the load op data to the data buffer 440 may also be communicated to decode unit 451, to indicate that source data in those memory locations is now available.

SoC Examples

FIG. 5A is a block diagram of one embodiment of a system-on-a-chip (SoC) including a plurality of processors 105 and a coprocessor 110. In the embodiment shown, SoC 500 includes processors 105A-105D. In one embodiment, at least some of processors 105A-105D may be heterogenous with respect to one another. For example, two of processors 105A-105D in one embodiment may be optimized for workloads having a high performance demand, while the other two of these processors are optimized for power efficiency and workloads that do not require high performance. Embodiments are also possible and contemplated where processors 105A-105D are homogenous with respect to one another.

Coprocessor 110 in the embodiment shown is shared by the processors 105A-105D. More particularly, coprocessor 110 may play a subordinate role to the various processors 105A-105D, augmenting their operation by executing coprocessor instructions for which it is optimized. For example, coprocessor 110 may be optimized for executing vector and matrix instructions per the embodiments discussed above.

Coprocessor 110 includes a coprocessor prefetcher 120 which may correspond to any of the embodiments discussed elsewhere herein. Although not explicitly shown here, each of processors 105A-105D may include a store queue through which coprocessor prefetcher 120 may monitor received code sequences for the presence of coprocessor instructions. Upon detecting the presence of coprocessor instructions in a given one of processors 105A-105D, coprocessor prefetcher 120 may initiate a prefetch of corresponding operand data from a system memory (not shown in this drawing) into L2 cache 335 (which is shared among the processors 105A-105D and coprocessor 110). It is noted that at any given time, coprocessor instructions may be pending for more than one of processors 105A-105D.

FIG. 5B is a block diagram of one embodiment of a system that includes a system on a chip (SoC) 550 coupled to a memory 502. As implied by the name, the components of the SoC 550 may be integrated onto a single semiconductor substrate as an integrated circuit "chip." In the illustrated embodiment, the components of the SoC 550 include at least one processor cluster 504, one or more peripheral components such as peripheral components 508A-508B (more briefly, "peripherals"), a memory controller 510, and a communication fabric 512. The components 504, 508A-508B, and 510 may all be coupled to the communication fabric 512. The memory controller 510 may be coupled to the memory 502 during use. In some embodiments, there may be more than one memory controller coupled to a corresponding memory. The memory address space may be mapped across the memory controllers in any desired fashion in such embodiments. In the illustrated embodiment, the processor cluster 504 may include a plurality of processors (P) 105. The processors 105 may form the central processing units (CPU(s)) of the SoC 550. The processor cluster 504 may further include one or more coprocessors (e.g., the coprocessor 110 in FIG. 5A) that may be optimized for a subset of the processor instruction set and may be used by the processors 105 to execute instructions in the subset. For example, the coprocessor 110 may be a matrix engine optimized to perform vector and matrix operations, as discussed above.

As mentioned above, the processor cluster 504 may include one or more processors 105 that may serve as the CPU of the SoC 550. The CPU of the system includes the processor(s) that execute the main control software of the system, such as an operating system. Generally, software executed by the CPU during use may control the other components to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SoC 550) or other levels of integration. Processors may further encompass discrete microprocessors, processor cores and/or microprocessors integrated into multichip module implementations, processors implemented as multiple integrated circuits, etc.

The memory controller 510 may generally include the circuitry for receiving memory operations from the other components of the SoC 550 and for accessing the memory 502 to complete the memory operations. The memory controller 510 may be configured to access any type of memory 502. For example, the memory 502 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 510 may include queues for memory operations, for ordering (and potentially reordering) the operations and presenting the operations to the memory 502. The memory controller 510 may further include data buffers to store write data awaiting write to memory and read data awaiting return to the source of the memory operation. In some embodiments, the memory controller 510 may include a memory cache to store recently accessed memory data. In SoC implementations, for example, the memory cache may reduce power consumption in the SoC by avoiding reaccess of data from the memory 502 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 510.

The peripherals 508A-508B may be any set of additional hardware functionality included in the SoC 550. For example, the peripherals 508A-508B may include video peripherals such as one or more graphics processing units (GPUs), an image signal processor configured to process image capture data from a camera or other image sensor, video encoder/decoders, scalers, rotators, blenders, display controllers, etc. The peripherals may include audio peripherals such as microphones, speakers, interfaces to microphones and speakers, audio processors, digital signal processors, mixers, etc. The peripherals may include interface controllers for various interfaces external to the SoC 550 including interfaces such as Universal Serial Bus (USB), peripheral component interconnect (PCI) including PCI Express (PCIe), serial and parallel ports, etc. The interconnection to external devices is illustrated by the dashed arrow in FIG. 5B that extends external to the SoC 550. The peripherals may include networking peripherals such as media access controllers (MACs). Any set of hardware may be included.

The communication fabric 512 may be any communication interconnect and protocol for communicating among the components of the SoC 550. The communication fabric 512 may be bus-based, including shared bus configurations, cross bar configurations, and hierarchical buses with bridges. The communication fabric 512 may also be packet-based, and may be hierarchical with bridges, cross bar, point-to-point, or other interconnects.

It is noted that the number of components of the SoC 550 (and the number of subcomponents for those shown in FIG. 5B, such as the processors 105 in each processor cluster 504 may vary from embodiment to embodiment. Additionally, the number of processors 105 in one processor cluster 504 may differ from the number of processors 105 in another processor cluster 504 when multiple processor clusters are included. There may be more or fewer of each component/subcomponent than the number shown in FIG. 5B.

Although not explicitly shown in FIG. 5B, SoC 550 may include one or more lower level cache memories that may be shared by the various processors 105 and coprocessor 110 of processor cluster 504. Coprocessor 110 may further include a coprocessor prefetcher as discussed elsewhere herein, and may perform prefetches of operand data, into the cache, for coprocessor instructions.

Methods for Operating a Coprocessor Prefetcher:

FIG. 6 is a flow diagram of one embodiment of a method for operating a coprocessor prefetcher. Method 600 as discussed herein may be performed using any of the various hardware embodiments discussed above. Hardware embodiments not explicitly discussed herein but otherwise capable of carrying out Method 600 are also considered to fall within the scope of this disclosure.

Method 600 includes fetching, by a processor, instructions of an instruction stream, wherein the instruction stream includes processor instructions and further includes coprocessor instructions to be provided by the processor to a coprocessor for subsequent execution by the coprocessor (block 605). The method further includes monitoring the processor, using a coprocessor prefetcher, for a presence of coprocessor instructions (block 610). When coprocessor instructions are detected, the method further includes capturing, using the coprocessor prefetcher, memory addresses associated with the coprocessor instructions (block 615). After obtaining the memory addresses, the method includes prefetching data from the memory addresses associated with the coprocessor instructions, using the coprocessor prefetcher, into a cache memory (block 620).

In various embodiments, the memory addresses are physical addresses. In such embodiments, the method includes performing, using the processor, logical-to-physical address translations to generate the physical addresses and using the physical addresses, by the prefetcher, to prefetch the data. The method may also include monitoring a store queue of the processor, by the coprocessor prefetcher, for a presence of coprocessor instructions.

In some embodiments, the method includes the coprocessor prefetcher, in response to initiating a prefetch of operand data for coprocessor instructions, providing an indication to a processor prefetcher. Embodiments of the method may also include the coprocessor prefetcher causing the operand data to be loaded into a level two cache, wherein the level two cache is shared by the processor, the coprocessor, and at least one additional processor. In embodiments utilizing a level two cache, the method may further include the coprocessor loading operand data from the level two cache into one or more of a plurality of registers in the coprocessor.

FIG. 7 is a flow diagram of another embodiment of a method for operating a coprocessor prefetcher. As with Method 600, Method 700 may be performed by any of the various hardware embodiments discussed above. Embodiments of hardware capable of carrying out Method 700, but not otherwise disclosed herein, are also considered to fall within the scope of this disclosure.

Method 700 includes detecting, using a coprocessor prefetcher, the presence of coprocessor instructions by monitoring a processor store queue (block 705). The coprocessor instructions may be initially received by the processor in an instruction stream that includes both processor instructions and coprocessor instructions. Method 700 further includes the coprocessor receiving physical addresses, using coprocessor prefetcher, of operand data corresponding to detected coprocessor instructions (block 710). The physical addresses may be initially generated by the processor based on address translations performed by, e.g., a translation lookaside buffer that stores logical-to-physical address translations. The physical addresses received by the coprocessor may correspond to the memory locations of operand data to be used during execution of the coprocessor instructions. Method 700 continues with the issuance of prefetches of the operand data from the corresponding physical addresses, using coprocessor prefetcher (block 715). In response to issuance of the prefetches, the method further includes the loading of operand data into shared cache (block 720). Subsequent to loading the operand data into the cache, it may be loaded into, e.g., registers in the coprocessor for use during execution of the corresponding coprocessor instructions. In one embodiment, a memory access interface in the coprocessor may load the data from the cache into the registers of the coprocessor in response to the coprocessor instructions being dispatched to the coprocessor by the processors. However, this embodiment is not intended to be limiting, and thus embodiments are possible and contemplated in which the operand data is loaded into the registers, from the cache, at a time earlier or later than that of the example presented herein.

Figure 8:
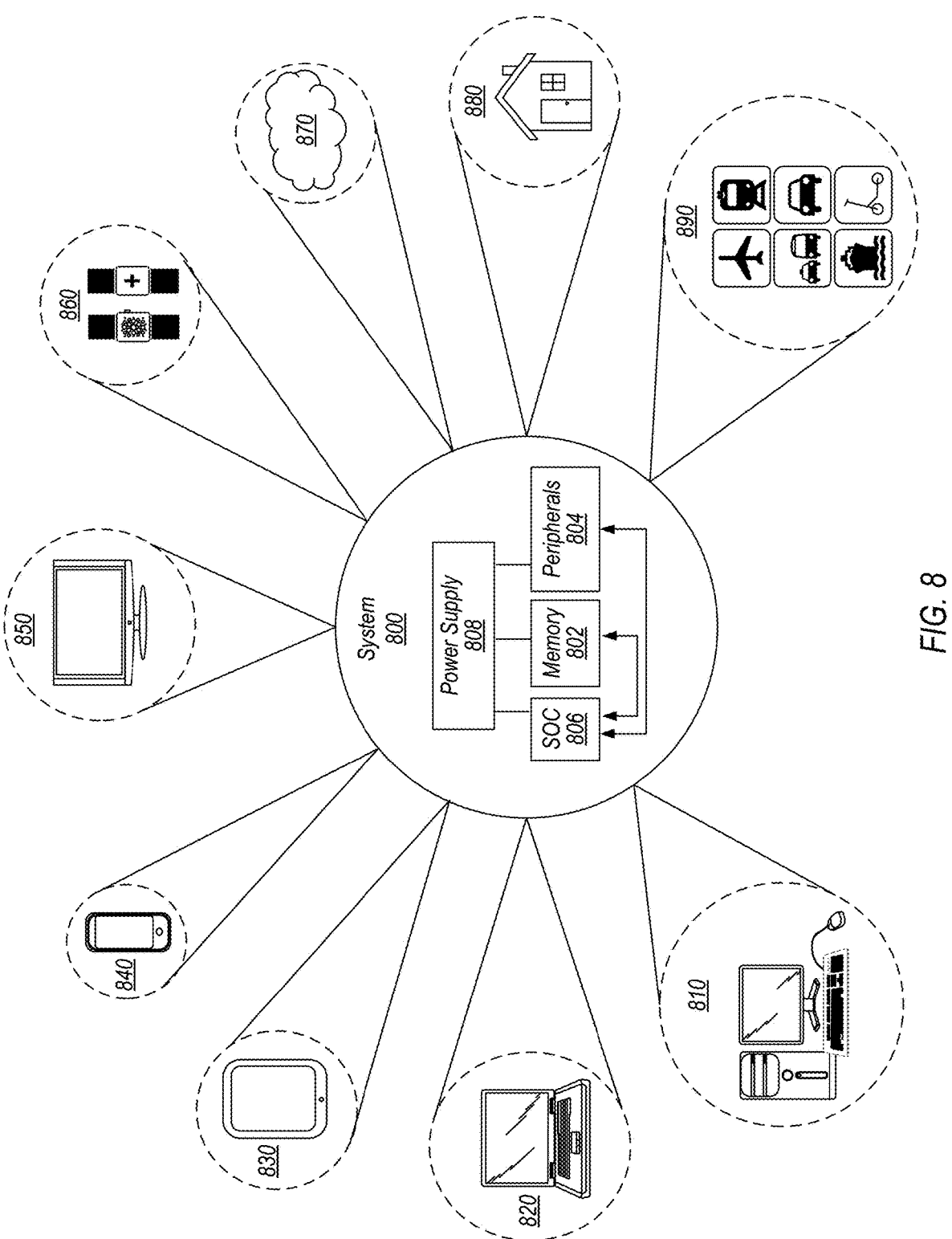
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 806 in the embodiment shown may include one or more processors or processor cores and a coprocessor, in accordance with the various embodiments discussed above. The processors/cores may be general purpose processors configured to execute instructions of an instruction set architecture. The coprocessor may play a subordinate role to the processors/cores, and may be optimized to execute particular instructions that are not otherwise executed by the processors/cores. For example, a coprocessor may be optimized to execute matrix and/or vector instructions. When these instructions are received in an instruction stream by a processor, they may be passed onto the coprocessor. In accordance with the discussion above, the coprocessor in various embodiments may include a dedicated coprocessor prefetcher that is used to prefetch, into a cache memory shared with the processors/cores, operand data to be used in executing coprocessor instructions. The coprocessor prefetcher may monitor code sequences provided to ones of the processors/cores for the presence of coprocessor instructions, may obtain therefrom addresses of corresponding operand data, and may issue prefetches of the operand data prior to the time it is needed for instruction execution.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home 880 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:

a coprocessor configured to execute coprocessor instructions;

coprocessor prefetch circuitry; and a processor configured to:

execute processor instructions, wherein the processor instructions and the coprocessor instructions appear together in code sequences fetched by the processor;

provide the coprocessor instructions to the coprocessor; and provide memory addresses to the coprocessor prefetch circuitry that correspond to operand data for the coprocessor instructions;

wherein the coprocessor prefetch circuitry is configured to generate prefetches of the corresponding operand data based on the memory addresses, including to generate a prefetch of operand data based on a memory address, provided based on a corresponding coprocessor instruction, prior to the processor providing the corresponding coprocessor instruction to the coprocessor.

2. The apparatus of claim 1, wherein the coprocessor prefetch circuitry is included in the coprocessor.

3. The apparatus of claim 1, wherein the memory addresses are in a system memory space.

4. The apparatus of claim 1, wherein the coprocessor is configured to perform matrix operations.

5. The apparatus of claim 1, wherein the coprocessor prefetch circuitry is configured to generate prefetches into a cache accessible to the coprocessor prefetch circuitry.

6. The apparatus of claim 5, wherein the cache is shared with the processor.

7. The apparatus of claim 5, wherein the cache is internal to the coprocessor.

8. The apparatus of claim 1, wherein the coprocessor prefetch circuitry is configured to, in response to completion of the prefetch, store the operand data from the prefetch in a register of the coprocessor.

9. The apparatus of claim 1, wherein at least one of the generated prefetches is to a cache in a cache hierarchy to fetch the corresponding operand data.

10. The apparatus of claim 1, wherein the generated prefetches are to non-predictive addresses.

11. The apparatus of claim 1, wherein the processor includes processor prefetch circuitry configured to prefetch operand data for operations performed by the processor, wherein the coprocessor prefetch circuitry is configured to forego one or more prefetches based on prefetch indications from the processor prefetch circuitry.

12. The apparatus of claim 11, wherein one or more prefetches generated by the processor prefetch circuitry are predictive.

13. The apparatus of claim 1, wherein the memory addresses are physical addresses.

14. The apparatus of claim 1, wherein the memory addresses are virtual addresses.

15. The apparatus of claim 1, wherein the processor includes a store queue, and wherein the coprocessor prefetch circuitry is configured to monitor the store queue for the memory addresses of the coprocessor instructions.

16. The apparatus of claim 1, wherein the apparatus is a computing system that further includes:

network interface circuitry; and display controller circuitry.

17. A method, comprising:

executing, by a coprocessor of a computing system, coprocessor instructions;

executing, by a processor of the computing system, processor instructions, wherein the processor instructions and the coprocessor instructions appear together in code sequences fetched by the processor;

providing, by the processor, the coprocessor instructions to the coprocessor;

providing, by the processor to a coprocessor prefetcher of the computing system, memory addresses that correspond to operand data for the coprocessor instructions; and generating, by the coprocessor prefetcher, prefetches of the corresponding operand data based on the memory addresses, including generating a prefetch of operand data based on a memory address, provided based on a corresponding coprocessor instruction, prior to the processor providing the corresponding coprocessor instruction to the coprocessor.

18. The method of claim 17, wherein the coprocessor instructions specify matrix multiplication operations.

19. The method of claim 17, further comprising:

fetching the corresponding operand data into a cache based on the generated prefetches; and storing the corresponding operand data in operand registers in response to the fetching of the corresponding operand data.

20. A system, comprising:

a first processor core;

a second processor core;

a coprocessor configured to execute coprocessor instructions; and coprocessor prefetch circuitry;

wherein the first processor core is configured to:

execute first processor instructions, wherein the first processor instructions and a first portion of the coprocessor instructions appear together in code sequences fetched by the first processor core;

provide the first portion of the coprocessor instructions to the coprocessor; and provide first memory addresses to the coprocessor prefetch circuitry that correspond to first operand data for the first portion of the coprocessor instructions;

wherein the second processor core is configured to:

execute second processor instructions, wherein the second processor instructions and a second portion of the coprocessor instructions appear together in code sequences fetched by the second processor core;

provide the second portion of the coprocessor instructions to the coprocessor; and provide second memory addresses to the coprocessor prefetch circuitry that correspond to second operand data for the second portion of the coprocessor instructions:

wherein the coprocessor prefetch circuitry is configured to:

generate prefetches of the corresponding first operand data based on the first memory addresses, including to generate a first prefetch of operand data based on a memory address, provided based on a first corresponding coprocessor instruction, prior to the first processor core providing the first corresponding coprocessor instruction to the coprocessor; and generate prefetches of the corresponding second operand data based on the second memory addresses, including to generate a second prefetch of operand data based on a memory address, provided based on a second corresponding coprocessor instruction, prior to the second processor core providing the second corresponding coprocessor instruction to the coprocessor.

* * * * *